(12) United States Patent
Yashima (10) Patent No.: US 12,416,783 B2
(45) Date of Patent: Sep. 16, 2025

(54) OPTICAL ELEMENT, OPTICAL APPARATUS, AND IMAGE PICKUP APPARATUS

(71) Applicant: CANON KABUSHIKI KAISHA, Tokyo (JP)

(72) Inventor: Kumiko Yashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 373 days.

(21) Appl. No.: 18/186,438

(22) Filed: Mar. 20, 2023

(65) Prior Publication Data

US 2023/0305267 A1   Sep. 28, 2023

(30) Foreign Application Priority Data

Mar. 25, 2022 (JP) ................................. 2022-050104

(51) Int. Cl.
*G02B 9/10* (2006.01)
*G02B 13/00* (2006.01)

(52) U.S. Cl.
CPC .............. *G02B 9/10* (2013.01); *G02B 13/006* (2013.01)

(58) Field of Classification Search
CPC .................................. G02B 9/10; G02B 13/006
See application file for complete search history.

(56) References Cited

U.S. PATENT DOCUMENTS

| | | |
|---|---|---|
| 2015/0097109 A1 | 4/2015 | Maetaki |
| 2019/0238733 A1 | 8/2019 | Yashima |
| 2020/0049862 A1 | 2/2020 | Ogane et al. |

FOREIGN PATENT DOCUMENTS

| | | |
|---|---|---|
| JP | 2010164718 A | 7/2010 |
| JP | 2010169708 A | 8/2010 |
| JP | 2010271450 A | 12/2010 |
| JP | 2012027331 A | 2/2012 |
| JP | 2012159726 A | 8/2012 |
| JP | 2017227938 A | 12/2017 |

*Primary Examiner* — Jack Dinh
(74) *Attorney, Agent, or Firm* — Canon U.S.A., Inc. IP Division (57) ABSTRACT

An optical element including a first lens, a second lens, and an optical resin arranged between the lenses. The opposing surfaces of the first lens and the optical resin, and/or the opposing surfaces of the optical resin and the second lens are joined to each other with an adhesive resin having a specific elastic modulus. The first lens is a convex lens and the second lens is a concave lens. The thickness of the center of the optical resin is thicker than the thickness of the outer edge of the optical resin. The second lens has, on its outer periphery, a step structure thinner than the maximum thickness of the second lens. The thickness of the step structure and the thickness of the center of the optical resin satisfy a specific relationship.

10 Claims, 4 Drawing Sheets

OPTICAL ELEMENT, OPTICAL APPARATUS, AND IMAGE PICKUP APPARATUS

BACKGROUND

Field

The present disclosure relates to an optical element, an optical apparatus including an optical element, and an image pickup apparatus including an optical element.

Description of the Related Art

A composite optical element obtained by arranging an optical resin between a plurality of lenses has been used in an optical system, such as a digital camera or a video camera, and hence has been required to have a small size and high optical performance. In such composite optical element, performance that cannot be achieved with one kind of material is obtained by using different kinds of materials in combination. In, for example, Japanese Patent Application Laid-Open No. 2017-227938, as an optical element for reducing a chromatic aberration, there is a disclosure of an optical element including a plurality of optical components, such as a resin and glass.

In a composite optical element obtained by combining optical components made of different kinds of materials, an adhesion force between the materials is low, and the materials differ from each other in characteristic changes along with a temperature change. Accordingly, the composite optical element has a disadvantage in that its shape is liable to change, and a crack or peeling is liable to occur.

In Japanese Patent Application Laid-Open No. 2017-227938, to solve the above-mentioned disadvantage, the diameter of a lens and the diameter of an optical layer formed of an organic material are specified. The specification suppresses a stress caused by the expansion or shrinkage of the lens or the layer along with a temperature change. In Japanese Patent Application Laid-Open No. 2017-227938, there is a proposal of a joined optical element that is thus suppressed from causing a crack or peeling.

However, the optical element described in Japanese Patent Application Laid-Open No. 2017-227938 has been susceptible to improvement in terms of suppression of peeling in a usage environment involving a temperature change. In addition, in the optical element having the configuration described in Japanese Patent Application Laid-Open No. 2017-227938, a change in surface shape of the optical element has been large in a usage environment involving a temperature change in some cases.

SUMMARY

In view of the foregoing, an aspect of the present disclosure is to provide an optical element, which can suppress a change in surface shape thereof while effectively suppressing peeling between optical components made of materials different from each other in a usage environment involving a temperature change.

According to at least one viewpoint of the present disclosure, there is provided an optical element including: a first lens, a second lens, an optical resin arranged between the first lens and the second lens, and an adhesive resin, wherein opposing surfaces of the first lens and the optical resin, and/or opposing surfaces of the optical resin and the second lens are joined to each other with the adhesive resin, wherein the first lens is a convex lens and the second lens is a concave lens, wherein when a thickness of a center of the optical resin is represented by t0, and a thickness of an outer edge of the optical resin is represented by t1, the t0 is larger than the t1, wherein when an elastic modulus of the adhesive resin at 20° C. is represented by Ead1, and an elastic modulus of the adhesive resin at 60° C. is represented by Ead2, the Ead1 and the Ead2 satisfy a relationship represented by the following formula (1):

$$0.2 \leq Ead2/Ead1 \leq 0.5 \tag{1},$$

wherein the second lens has, on an outer periphery thereof, a step structure thinner than a maximum thickness of the second lens, and wherein when a thickness of the step structure is represented by "h", the t0 and the "h" satisfy a relationship represented by the following formula (2).

$$2.5 \leq h/t0 \leq 8.5 \tag{2}$$

In addition, according to at least another viewpoint of the present disclosure, there is provided an optical apparatus including: a housing; and an optical system arranged in the housing, the optical system having at least one lens, wherein at least one of the lenses is the above-mentioned optical element.

In addition, according to at least still another viewpoint of the present disclosure, there is provided an image pickup apparatus including: a housing; an optical system arranged in the housing, the optical system having at least one lens; and an image pickup element configured to receive light that has passed through the optical system, wherein at least one of the lenses is the above-mentioned optical element.

Further features of the present disclosure will become apparent from the following description of exemplary embodiments with reference to the attached drawings.

DESCRIPTION OF THE EMBODIMENTS

An optical element according to one embodiment of the present disclosure is described below.

(Composite Optical Element)

Figure 1:
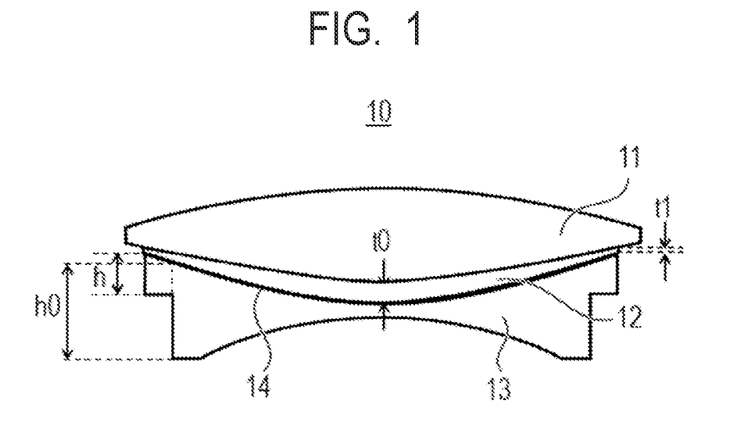
FIG. 1 is a sectional view of a composite optical element according to one embodiment of the present disclosure.

As illustrated in FIG. 1, a composite optical element 10 according to one embodiment of the present disclosure includes at least three optical components formed of a first lens 11, an optical resin 12, and a second lens 13. In the present disclosure, the opposing surfaces of the first lens 11 and the optical resin 12, and/or the opposing surfaces of the optical resin 12 and the second lens 13 are joined to each other with an adhesive resin serving as an adhesive. In this embodiment, an example in which the opposing surfaces of the optical resin 12 and the second lens 13 are joined to each other with an adhesive resin 14 is illustrated.

The first lens 11 is a convex lens. The first lens 11 preferably includes glass because a change in volume thereof along with a temperature change is small. However, the lens may include plastic.

The thickness t0 of the center of the optical resin 12 is larger than the thickness t1 of the outer edge of the optical resin. The term "thickness t0 of the center of the optical resin 12" as used herein refers to the thickness of the optical resin 12 along the optical axis of the optical element 10. The thickness t0 of the center of the optical resin 12 may be set to from 0.5 mm to 1.5 mm.

For example, a resin material having a d-line refractive index of from 1.50 to 1.67, an Abbe number ($v_d$) of from 16.7 to 21.5, and a secondary dispersion characteristic ($\theta g,F$) of from 0.70 to 0.85 may be used as a material for the optical resin 12. The use of a material having a secondary dispersion characteristic ($\theta g,F$) as high as 0.70 or more enables the design of an optical system that efficiently reduces the chromatic aberration of light having a short wavelength in visible light.

A material obtained by polymerizing or copolymerizing a compound represented by the following general formula (A), the compound having an acryloyl group or a methacryloyl group, may be used as a specific material for the optical resin 12:

(A)

in the formula (A), X and Y each independently represent any structure selected from the following structures, * in each of the following structures represents a bonding site to be bonded to $R^1$ or $R^2$:

| | |
|---|---|
| *—S— | *—O— |
| *—O—CH$_2$CH$_2$—O— | *—O—CH$_2$CH$_2$—S— |
| *—S—CH$_2$CH$_2$—O— | *—S—CH$_2$CH$_2$—S— |
| *—O—CH$_2$CH$_2$CH$_2$—O— | *—S—CH$_2$CH$_2$CH$_2$—S— |
| *—S—CH$_2$CH$_2$CH$_2$—O— | *—S—CH$_2$CH$_2$CH$_2$—S— |
| *—S—CH$_2$CH$_2$CH$_2$CH$_2$—S— | *—O—CH$_2$CH$_2$CH$_2$CH$_2$—O— |
| *—O—CH$_2$CH$_2$CH$_2$CH$_2$—S— | *—S—CH$_2$CH$_2$CH$_2$CH$_2$—O—, |

$R^1$ and $R^2$ each independently represent any atom or group selected from a hydrogen atom, a methyl group, an ethyl group, an acryloyl group, and a methacryloyl group, $Z^1$ and $Z^2$ each independently represent any atom or group selected from a hydrogen atom, a halogen atom, an alkoxy group having 1 or 2 carbon atoms, an alkylthio group having 1 or 2 carbon atoms, a methyl group, an ethyl group, and a group represented by the following formula (B), and "a" and "b" each represent an integer of from 0 to 2, when "a" represents 2, two Z's may be identical to or different from each other, and when "b" represents 2, two $Z^2$s may be identical to or different from each other:

(B)

in the formula (B), ** represents a bonding site to be bonded to a benzene ring, $R^3$ represents a hydrogen atom or a methyl group, "m" represents 0 or 1, and "n" represents an integer of from 2 to 4.

In addition, a material obtained by polymerizing or copolymerizing a compound represented by the following general formula (C) may be used as a specific material for the optical resin 12:

(C)

in the formula (C), $R^4$ and $R^5$ each independently represent a substituted or unsubstituted alkyl group having 1 to 10 carbon atoms, or a substituted or unsubstituted alkyl group having 1 to 8 carbon atoms, the alkyl group having a polymerizable functional group at a terminal thereof, $R^6$ to $R^{15}$ each independently represent any atom or group selected from a hydrogen atom, a cyano group, a trifluoromethyl group, a substituted or unsubstituted alkyl group, a substituted or unsubstituted alkyl group having a polymerizable functional group at a terminal thereof, and a polymerizable functional group, provided that at least one of $R^7$ to $R^9$ and $R^{12}$ to $R^{14}$ represents a cyano group or a trifluoromethyl group, and at least one of $R^4$ to $R^{15}$ has a polymerizable functional group, and the polymerizable functional group that $R^4$ to $R^{15}$ may each have is an acryloyloxy group, a methacryloyloxy group, a vinyl group, or an epoxy group.

Herein, examples of the substituted or unsubstituted alkyl group having 1 to 10 carbon atoms, which is represented by each of $R^4$ and $R^5$ in the formula (C), include a methyl group, an ethyl group, a n-propyl group, a n-butyl group, a n-pentyl group, a n-hexyl group, a n-heptyl group, a n-octyl group, a n-decyl group, an iso-propyl group, an iso-butyl group, a sec-butyl group, a tert-butyl group, an iso-pentyl group, a neopentyl group, and a 2-ethylhexyl group. However, the alkyl group is not limited thereto as long as a high secondary dispersion characteristic ($\theta g,F$) is obtained. $R^4$ and $R^5$ each independently represent preferably an alkyl group having 1 to 8 carbon atoms, more preferably a methyl group or an ethyl group.

In addition, examples of the substituted or unsubstituted alkyl group, which is represented by each of $R^6$ to $R^{15}$ in the formula (C), include a methyl group, an ethyl group, a n-propyl group, a n-butyl group, an iso-propyl group, an iso-butyl group, a sec-butyl group, and a tert-butyl group. However, the alkyl group is not limited thereto as long as a high secondary dispersion characteristic ($\theta g,F$) is obtained. $R^6$ to $R^{15}$ each independently represent preferably a methyl group or an ethyl group.

The second lens 13 is a concave lens. The second lens 13 preferably includes glass. However, the lens may include plastic.

An acrylic photocurable resin, an epoxy-based curable resin, and the like may each be used as a material for the adhesive resin 14. Of those, an acrylic photocurable resin is preferably used because the resin is excellent in moldability.

When the elastic modulus of the adhesive resin 14 at 20° C. is represented by Ead1, and the elastic modulus of the adhesive resin 14 at 60° C. is represented by Ead2, the Ead1 and the Ead2 satisfy a relationship represented by the following formula (1).

$$0.2 \leq Ead2/Ead1 \leq 0.5 \tag{1}$$

According to an investigation made by the inventors, in the optical element described in Japanese Patent Application Laid-Open No. 2017-227938, when optical components for forming the optical element largely differ from each other in linear expansion coefficient, peeling between the components has occurred at high temperatures in some cases. Then, the inventors have made further investigations, and as a result, have found that when the elastic moduli of the adhesive resin serving as an adhesive to be used for joining different optical components to each other satisfy the condition represented by the formula (1), the peeling at high temperatures can be effectively suppressed.

When the ratio "Ead2/Ead1" is 0.2 or more, the adhesive resin 14 has sufficiently high elastic moduli even at high temperatures, and hence can maintain a high adhesive force. Accordingly, peeling at an interface between the optical components is suppressed. In addition, when the ratio "Ead2/Ead1" is 0.5 or less, the adhesive resin 14 can sufficiently undergo an elastic deformation at high temperatures, and hence the peeling at the interface between the optical components is suppressed.

In the adhesive resin 14 whose Ead1 and Ead2 satisfy the relationship represented by the formula (1), its elastic modulus at 60° C. is smaller than its elastic modulus at 20° C., and hence the adhesive resin 14 easily deforms at high temperatures. Accordingly, in the composite optical element obtained by joining the plurality of optical components, which largely differ from each other in linear expansion coefficient, to each other with the adhesive resin 14, peeling between the optical components that occurs at high temperatures can be suppressed.

However, when the adhesive resin 14 whose Ead1 and Ead2 satisfy the relationship represented by the formula (1) is applied to the optical element described in Japanese Patent Application Laid-Open No. 2017-227938, the optical performance of the element has reduced in some cases, though the peeling can be effectively suppressed. The reduction in optical performance may result from the fact that when an environment surrounding the optical element is returned from a high-temperature environment to an environment whose temperature is equal to or less than a medium temperature such as room temperature, a change in surface shape of each of the optical components has become larger.

In the composite optical element using the adhesive resin whose Ead1 and Ead2 satisfy the relationship represented by the formula (1), when its temperature is increased, and is then returned to the original temperature, a phenomenon called warping-back occurs. The term "warping-back" as used herein refers to the following phenomenon.

In the optical element using the adhesive resin whose Ead1 and Ead2 satisfy the relationship represented by the formula (1), the elastic modulus of the adhesive resin reduces at high temperatures, and hence the stress thereof is easily relaxed. Thus, the deformation of the element caused by the expansion of the optical components, in particular, the optical resin due to a temperature change can be relaxed. After that, when an environment surrounding the element is returned to an environment whose temperature is equal to or less than a medium temperature such as room temperature, the deformation thereof occurs owing to the shrinkage of the optical components. Thus, the element deforms into a shape that is warped to a larger extent than its original shape is. Details about the warping-back are further described with reference to FIG. 2A to FIG. 2D.

FIG. 2A to FIG. 2D are each a schematic view for illustrating a deformation occurring along with a temperature change in the composite optical element according to this embodiment.

Figure 2A:
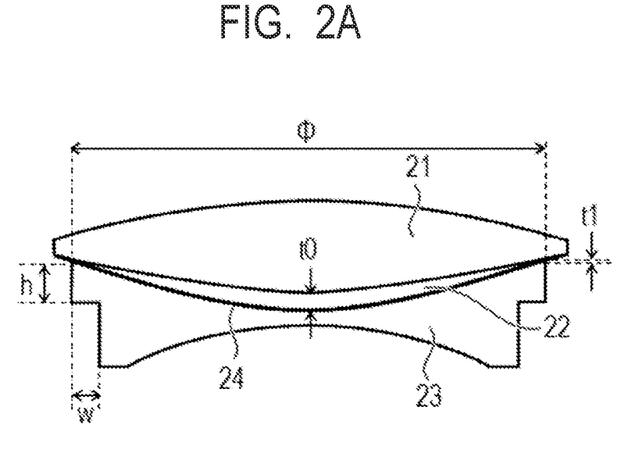
FIG. 2A, FIG. 2B, FIG. 2C, and FIG. 2D are each a view for illustrating the mechanism via which the composite optical element according to one embodiment of the present disclosure deforms along with a temperature change.

FIG. 2A is an illustration of the optical element according to this embodiment at room temperature (e.g., 20° C.), and the element includes: a first lens 21 that is a convex lens; an optical resin 22 formed of an organic material; a second lens 23 that is a concave lens; and an adhesive resin 24. The optical resin 22 is characterized in that the thickness t0 of its central portion is thicker than the thickness t1 of its outer edge. An adhesive resin whose Ead1 and Ead2 satisfy the relationship represented by the formula (1) is used as the adhesive resin 24.

Figure 2B:
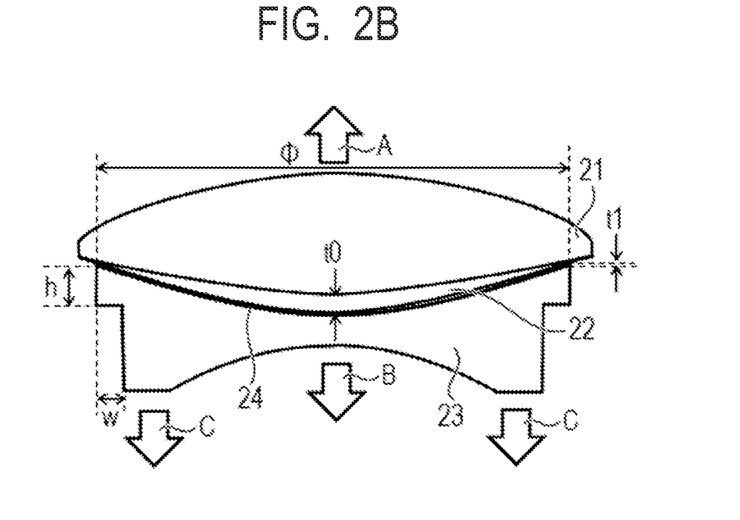

FIG. 2B is a schematic view for illustrating the optical element according to this embodiment when its temperature reaches a high temperature (e.g., 60° C.). The main deformation of the convex lens at the high temperature occurs in the central portion of the lens (a deformation A in the central portion of the first lens 21). The deformation is the combination of a deformation caused by the expansion of the first lens 21 and a deformation caused by the expansion of the optical resin 22.

In addition, the deformations of the second lens 23 at the high temperature are mainly classified into the following two deformations: a deformation caused by the expansion of the optical resin 22, which occurs in the central portion of the lens (a deformation B in the central portion of the second lens 23); and a deformation caused by the expansion of the second lens 23, which occurs in the outside where the thickness of the lens is thick (a deformation C in the outside of the second lens 23).

Figure 2C:
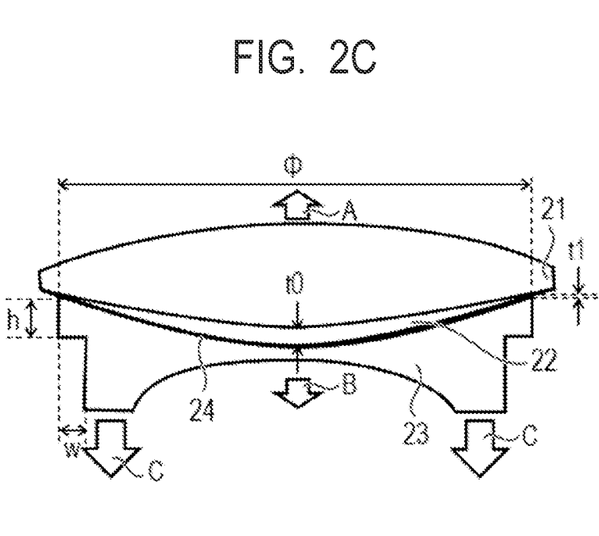

After that, when the optical element is held at the high temperature, the elastic modulus of the adhesive resin reduces to facilitate the relaxation of the stress thereof. Because of the foregoing fact, places where deformations are relaxed appear as illustrated in FIG. 2C. The places where the deformations are easily relaxed are the central portion of the first lens 21 and the central portion of the second lens 23. Both the portions are sites largely affected by the expansion of the optical resin 22.

Figure 2D:
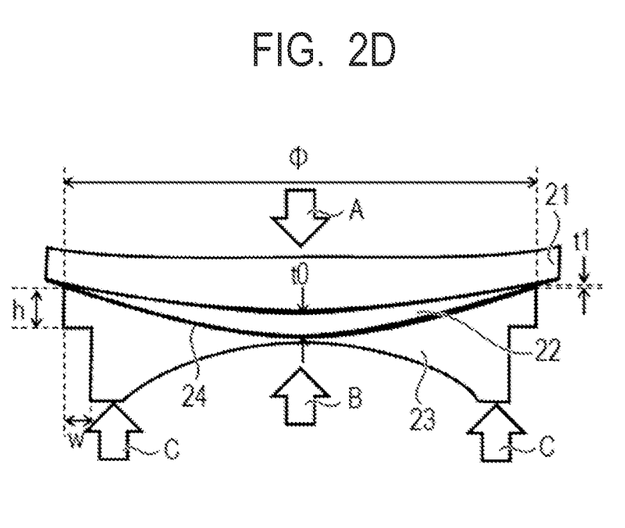

When the optical element is cooled to its original temperature such as room temperature after having been held at the high temperature, as illustrated in FIG. 2D, the central portion of the first lens 21, and both the central portion and outside of the second lens 23 shrink in proportion to their linear expansion coefficients. Accordingly, the warping-back phenomenon in which the element is warped as compared to its original shape occurs. To suppress the warping-back, lenses each having a thickness corresponding to the thickness t0 of the center of the optical resin 22 need to be used.

Particularly in the case of the second lens 23, when the thickness of the second lens 23 is excessively thin as compared to the thickness t0 of the center of the optical resin 22, the lens is liable to be affected by the expansion of the resin, and hence a local deformation is liable to remain as a kink. In addition, meanwhile, when the thickness of the outside of the second lens is excessively thick, the deformation of the central portion thereof is relaxed, but the influence of the expansion is liable to remain in the outside, and hence a local deformation is liable to remain in the outside. In view of the foregoing, the inventors have found that in the present disclosure, it is important to use the second lens 23 having a thickness appropriate for the thickness t0 of the center of the optical resin 22.

In the composite optical element according to this embodiment, as illustrated in each of FIG. 1 and FIG. 2A to FIG. 2D, the second lens 23 has, on its outer periphery, a step structure formed integrally with the second lens 23. The step structure extends in a direction along a surface perpendicular to an optical axis in the outer periphery of the second lens 23, and the optical resin 22 and the adhesive resin 24 are sandwiched between the structure and the first lens 21 so that peeling between the optical components of the element may be suppressed. The thickness "h" of the step structure is smaller than the maximum thickness h0 of the second lens 23, and the thickness t0 of the center of the optical resin and the thickness "h" of the step structure satisfy a relationship represented by the following formula (2).

$$2.5 \leq h/t0 \leq 8.5 \quad (2)$$

In the composite optical element according to this embodiment, when the second lens 23 has a thickness corresponding to the thickness t0 of the center of the optical resin so as to satisfy the formula (2), a local deformation can be suppressed from remaining in the second lens 23. Accordingly, in the composite optical element according to this embodiment, a change in surface shape of the optical element when its temperature is increased, and is then returned to the original temperature is suppressed, and hence a reduction in optical performance thereof can be prevented.

In the composite optical element according to this embodiment, the thickness t0 of the center of the optical resin 22 and the thickness "h" of the step structure of the second lens more preferably satisfy a relationship represented by the following formula (3). Thus, the occurrence of a kink can be more effectively reduced.

$$4.0 \leq h/t0 \leq 6.5 \quad (3)$$

The maximum thickness h0 of the second lens 23 and the thickness "h" of the step structure may be specifically set so as to satisfy, for example, a relationship represented by the following formula (4).

$$0.28 \leq h/h0 \leq 0.61 \quad (4)$$

In addition, in the composite optical element according to this embodiment, the diameter $\Phi$ of the second lens 23 and the width "w" of the above-mentioned step structure preferably satisfy a relationship represented by the following formula (5).

$$(\Phi/2) \times 0.05 \leq w \leq (\Phi/2) \times 0.3 \quad (5)$$

When the width "w" of the step structure is 0.3 or less times as large as the radius ($\Phi/2$) of the second lens 23, the occurrence of a ghost and flare in an optical system resulting from the fact that the second lens 23 has the step structure can be suppressed, and hence a reduction in optical performance of the optical element can be suppressed. In addition, when the width "w" of the step structure is 0.05 or more times as large as the radius ($\Phi/2$) of the second lens 23, a high reducing effect on a stress caused by the deformation of each of the optical components of the element along with a change in temperature environment can be obtained, and hence peeling between the components can be effectively suppressed.

Further, in the optical element according to this embodiment, the diameter $\Phi$ of the second lens 23 is preferably from 30 mm to 50 mm. At this time, the effect of the present disclosure is more significantly exhibited. When the diameter $\Phi$ of the second lens 23 is 30 mm or more, the thickness of the outer periphery of the second lens 23 becomes relatively thick, and hence the thermal deformation thereof becomes larger. Thus, a disadvantage to be solved by the present disclosure becomes significant. In addition, when the diameter $\Phi$ of the second lens 23 is 50 mm or less, peeling between the optical components of the element caused by the expansion of the optical resin 22 and the expansion of the outside of the second lens 23 can be suppressed.

(Optical Apparatus)

Specific application examples of the optical element according to this embodiment include: a lens for forming an optical apparatus (image taking optical system) for a camera or a video camera; and a lens for forming an optical apparatus (projecting optical system) for a liquid crystal projector. In addition, the optical element may be used in a pickup lens of a DVD recorder or the like. Those optical systems are each formed of at least one lens arranged in a housing, and the optical element of this embodiment may be used in at least one of the lenses. The element may also be used in, for example, a pair of binoculars and a telescope.

(Image Pickup Apparatus)

Figure 4:
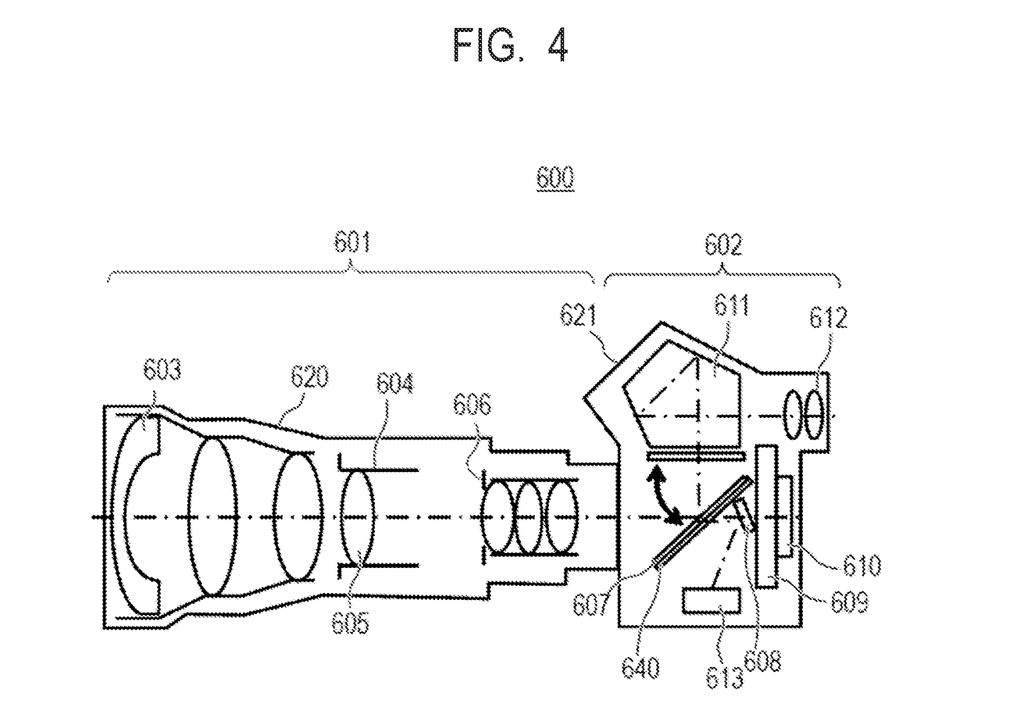
FIG. 4 is a schematic view for illustrating one embodiment of an image pickup apparatus.

FIG. 4 is a schematic view for illustrating the configuration of a single-lens reflex digital camera 600, which is an example of a suitable embodiment of an image pickup apparatus using the optical element of this embodiment. Although a state in which a camera main body 602 and a lens barrel 601 that is an optical apparatus are connected to each other is illustrated in FIG. 4, the lens barrel 601 is a so-called interchangeable lens removably mounted onto the camera main body 602.

The lens barrel 601 includes a housing 620, and an optical system formed of, for example, a plurality of lenses 603 and 605 is arranged on the optical axis of an image taking optical system in the housing 620. An image of light from an object is taken through the optical system formed of, for example, the plurality of lenses 603 and 605.

The optical element according to this embodiment may be used as, for example, the lenses 603 and/or 605. Herein, the lens 605 is supported by an inner barrel 604, and is movably supported with respect to the outer barrel of the lens barrel 601 for focusing and zooming.

In an observation period before the image taking, the light from the object is reflected by a main mirror 607 in a housing 621 of the camera main body to be transmitted through a prism 611. After that, the taken image is projected to a photographer through a finder lens 612. The main mirror 607 is, for example, a half mirror, and the light that has been transmitted through the main mirror is reflected toward an autofocus (AF) unit 613 by a submirror 608. The reflected light is used in, for example, distance measurement. In addition, the main mirror 607 is mounted on and supported by a main mirror holder 640 through bonding or the like. At the time of the image taking, the main mirror 607 and the submirror 608 are moved to the outside of an optical path via a driving mechanism (not shown) to open a shutter 609 so that an image pickup element 610 may receive the light that has entered from the lens barrel 601 and has passed through the image taking optical system to form a taken light image. In addition, a diaphragm 606 is configured to be capable of changing brightness and a focal depth at the time of the image taking by changing its opening area.

Herein, the image pickup apparatus has been described by using the single-lens reflex digital camera. However, the optical element of this embodiment may be similarly used in, for example, a smartphone, a compact digital camera, or a drone.

(Method of Producing Composite Optical Element)

A method of producing the composite optical element according to this embodiment is described with reference to FIG. 1.

First, an uncured UV-curable resin is ejected into a space between the first lens 11 and a die, and the space is filled with the resin until a desired optical diameter is obtained.

Next, UV light is applied from the first lens 11 side to the uncured UV-curable resin to sufficiently cure the UV-curable resin, to thereby arrange the optical resin 12 formed of the UV-curable resin on one surface of the first lens 11. After that, a releasing operation is performed.

Subsequently, the adhesive resin 14 is applied to the surface side of the optical resin 12 out of contact with the first lens 11. After that, the optical resin 12 and the second lens 13 are joined to each other with the adhesive resin 14. Thus, the composite optical element according to this embodiment can be produced.

In the method of producing the composite optical element, the order in which its optical components are molded and joined to each other may be changed. For example, the production may be performed by: molding the optical resin 12 on the second lens 13; and then joining the optical resin 12 and the first lens 11 to each other with the adhesive resin 14.

EXAMPLES

The present disclosure is described in more detail below by way of Examples. The present disclosure is by no means limited to Examples described below without departing from the gist of the present disclosure.

In each of Examples and Comparative Examples, measurement and evaluations were performed by the following methods.

(Thermal Durability)

The thermal durability of a composite optical element was evaluated as described below. First, the following endurance test was performed: the temperature of the composite optical element was increased from 25 to 70° C. over 40 minutes; and thereafter, the element was held at 70° C. for 12 hours, and was then cooled in an environment at a room temperature of 25° C. It was recognized that the temperature of the composite optical element became 25° C. or less 12 hours after the start of the cooling, and the surface shapes of the first lens and second lens of the element were measured with a three-dimensional optical shape-measuring machine (Verfire: Zygo Corporation). The region of the first lens corresponding to 80% of the lens diameter of the second lens was subjected to R-shape fitting, and the result of a change in surface shape thereof from the initial stage to a time point after the endurance test was converted into Newton's rings. Further, a difference between the amounts of deformation of the Newton's rings was calculated from the measured surface shapes, and the kink of each of the lenses was judged. The thermal durability was evaluated by the following criteria.

A: A change in kink of each of the first lens and the second lens falls within the range of ±317 nm.

B: A change in kink of the first lens or the second lens deviates from the range of ±317 nm.

(Elastic Modulus)

The elastic modulus of each of an optical resin and an adhesive resin in an optical element was measured by peeling a lens on one side of the element and then exposing the optical resin or the adhesive resin. Specifically, the elastic modulus was evaluated at room temperature with a nanoindenter (manufactured by Keysight Technologies, product name: Nanoindenter G200) while the indentation depth of the nanoindenter was set to 2 μm so that the elastic modulus was not affected by the substrate of the element.

Example 1

In Example 1, a composite optical element having a shape illustrated in FIG. 1 was produced.

S-FPM2 and S-NBH53V manufactured by Ohara Inc. were used as the first lens 11 and the second lens 13, respectively. An uncured acrylic UV-curable resin was applied to a space between convex-shaped optical glass serving as the first lens 11 and a die. After the space between the first lens 11 and the die had been filled with the applied UV-curable resin, UV light was applied from the first lens 11 side with an LED UV light-applying machine (H-1VH4-V3, HOYA CANDEO OPTRONICS CORPORATION) to cure the acrylic UV-curable resin. The UV light was applied under the conditions of a UV output of 15 mW/cm$^2$ and an application time of 200 seconds.

After the application, a releasing operation was performed to arrange the optical resin 12 formed of the acrylic UV-curable resin on the first lens 11. The acrylic UV-curable resin used in the formation of the optical resin 12 contains a compound represented by the general formula (C), and the optical resin 12 has an elastic modulus at 20° C. of 1.2 GPa and a linear expansion coefficient of 832×10$^{-7}$/° C. The optical resin 12 was molded on the first lens 11, and the thickness t0 of the central portion of the optical resin 12 and the thickness t1 of the outer edge thereof were 0.8 mm and 0.05 mm, respectively.

After that, the adhesive resin 14 was applied to the surface of the optical resin 12 out of contact with the first lens 11 to join the optical resin 12 and the second lens 13 having a concave shape to each other. The thickness "h" of a step structure arranged in the outer peripheral portion of the second lens 13 was 4.0 mm. An acrylic UV-curable resin was used as a material for the adhesive resin 14, and UV light for curing the acrylic UV-curable resin was applied under the conditions of an output of 2 mW/cm$^2$ and an application time of 2,000 seconds. The adhesive resin 14 thus formed through the curing had an elastic modulus Ead1 at 20° C. of 0.40 GPa and an elastic modulus Ead2 at 60° C. of 0.17 GPa, and hence had a ratio "Ead2/Ead1" of 0.43.

The respective evaluation results of the composite optical element according to Example 1 are shown in Table 1.

Example 2

In Example 1, the thickness "h" of the step structure of the second lens 13 was changed to 3.2 mm. A composite optical element was produced in the same manner as in Example 1 except the foregoing.

The respective evaluation results of the composite optical element according to Example 2 are shown in Table 1.

Comparative Example 1

In Example 1, the thickness "h" of the step structure of the second lens 13 was changed to 9.0 mm. A composite optical element was produced in the same manner as in Example 1 except the foregoing.

The respective evaluation results of the composite optical element according to Comparative Example 1 are shown in Table 1.

Comparative Example 2

In Example 1, the thickness "h" of the step structure of the second lens 13 was changed to 1.6 mm. A composite optical element was produced in the same manner as in Example 1 except the foregoing.

The respective evaluation results of the composite optical element according to Comparative Example 2 are shown in Table 1.

Example 3

Figure 3:
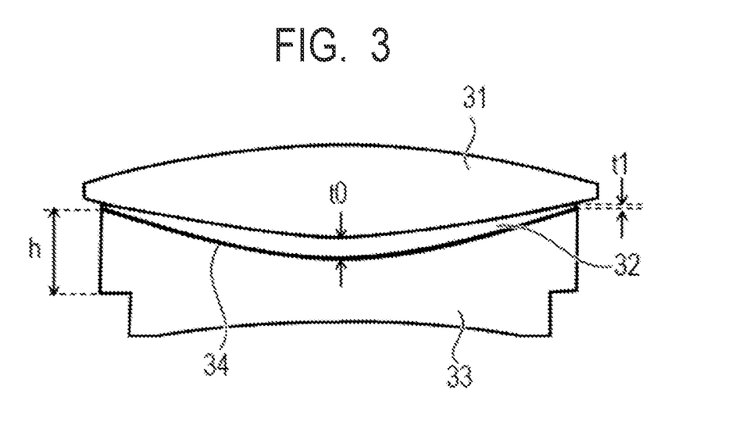
FIG. 3 is a sectional view of a composite optical element according to Example 3.

In Example 3, a composite optical element having a shape illustrated in FIG. 3 was produced.

In Example 3, optical glass TAFD45 manufactured by HOYA Corporation was used as a first lens 31. An acrylic UV-curable resin used in the formation of an optical resin 32 contains a polymer of a compound represented by the general formula (C), and the optical resin 32 has an elastic modulus at 20° C. of 1.2 GPa and a linear expansion coefficient of $832 \times 10^{-7}/°$ C. The optical resin 32 was molded on the first lens 31, and the thickness t0 of the central portion thereof and the thickness t1 of the outer edge thereof were 1.4 mm and 0.2 mm, respectively.

Optical glass S-TIL 2 manufactured by Ohara Inc. was used as a second lens 33. The thickness "h" of a step structure arranged in the outer peripheral portion of the second lens 33 was 6.0 mm. An acrylic resin, which had an elastic modulus Ead1 at 20° C. of 0.40 GPa and an elastic modulus Ead2 at 60° C. of 0.17 GPa, and hence had a ratio "Ead2/Ead1" of 0.43, was used as an adhesive resin 34.

A composite optical element was produced in the same manner as in Example 1 except that those materials were used, and were formed into the shape illustrated in FIG. 3.

The respective evaluation results of the composite optical element according to Example 3 are shown in Table 1.

Example 4

In Example 4, a composite optical element having a shape illustrated in FIG. 1 was produced.

In Example 4, optical glass TAFD45 manufactured by HOYA Corporation was used as a first lens 11. An acrylic UV-curable resin used in the formation of an optical resin 12 contains a compound represented by the general formula (A), and the optical resin 12 has an elastic modulus at 20° C. of 2.6 GPa and a linear expansion coefficient of $728 \times 10^{-7}/°$ C. The optical resin 12 was formed on the first lens 11, and the thickness t0 of the central portion thereof and the thickness t1 of the outer edge thereof were 0.5 mm and 0.05 mm, respectively. Optical glass S-TIL 2 manufactured by Ohara Inc. was used as a second lens 13. The thickness "h" of a step structure arranged in the outer peripheral portion of the second lens 13 was 2.5 mm.

An adhesive resin 14 used in Example 4 had an elastic modulus Ead1 at 20° C. of 0.65 GPa and an elastic modulus Ead2 at 60° C. of 0.23 GPa, and hence had a ratio "Ead2/Ead1" of 0.35. A composite optical element was produced in the same manner as in Example 1 except that those materials were used.

The respective evaluation results of the composite optical element according to Example 4 are shown in Table 1.

Example 5

In Example 4, the thickness "h" of the step structure of the second lens 13 was changed to 5.5 mm. A composite optical element was produced in the same manner as in Example 4 except the foregoing.

The respective evaluation results of the composite optical element according to Example 5 are shown in Table 1.

TABLE 1

| | Example 1 | Example 2 | Comparative Example 1 | Comparative Example 2 | Example 3 | Example 4 | Example 5 |
|---|---|---|---|---|---|---|---|
| Shape of optical element | FIG. 1 | FIG. 1 | FIG. 1 | FIG. 1 | FIG. 3 | FIG. 1 | FIG. 1 |
| Diameter of first lens [mm] | 39 | 39 | 39 | 39 | 47 | 43 | 43 |
| Diameter of second lens [mm] | 35.5 | 35.5 | 35.5 | 35.5 | 44 | 39 | 39 |
| Thickness of center of second lens [mm] | 1.5 | 1.5 | 1.5 | 1.5 | 2.5 | 1.7 | 1.7 |
| h0 of second lens [mm] | 8.0 | 8.0 | 8.0 | 8.0 | 10.0 | 9.0 | 9.0 |
| t0 [mm] | 0.8 | 0.8 | 0.8 | 0.8 | 1.4 | 0.5 | 0.5 |
| h [mm] | 4 | 3.2 | 9 | 1.6 | 6 | 2.5 | 5.5 |
| h/t0 | 5 | 4 | 11.3 | 2 | 4.3 | 5 | 8.5 |
| h/h0 | 0.50 | 0.40 | 1.13 | 0.20 | 0.60 | 0.28 | 0.61 |
| Width "w" of step structure of second lens [mm] | 2 | 2 | 2 | 2 | 4 | 2.6 | 2.6 |
| Kink [nm] | 208 | 228 | 356 | 323 | 247 | 245 | 295 |
| Evaluation | A | A | B | B | A | A | A |

In each of Examples 1 to 5 in which the ratio "h/t0" was from 2.5 to 8.5, the absolute value of a change in kink was 317 nm or less. In contrast, in each of Comparative Examples 1 and 2 in which the ratio "h/t0" deviated from the range of from 2.5 to 8.5, the absolute value of a change in kink was more than 317 nm.

Examples 6 and 7, and Comparative Examples 3 to 5

Composite optical elements according to Examples 6 and 7, and Comparative Examples 3 to 5 were each produced in the same manner as in Example 1 except that in Example 1, the kind of the adhesive resin 14 was changed to a kind having an elastic modulus shown in Table 2. The composite optical elements according to Examples 1, 6, and 7, and Comparative Examples 3 to 5 were each evaluated for peeling at an interface between optical components along with a change in temperature environment as described below.

The peeling evaluation was performed by: subjecting each of the composite optical elements to a heating test with an oven; and observing peeling at an interface between the optical resin 12 and the second lens 13, which had been bonded to each other with the adhesive resin 14, with a microscope. Temperature conditions at the time of the heating test were set as described below. That is, the temperature of the element was increased from 20° C. to 70° C. over 4 hours, was held at 70° C. for 12 hours, and was then decreased from 70° C. to 20° C. over 4 hours.

The observation of the peeling with the microscope was performed by focusing on a bonding surface between the optical resin 12 and second lens 13 of each of the optical elements after the lapse of about 1 hour from the temperature decrease. A case in which no peeling was found as a result of the observation was indicated by Symbol A, and a case in which the peeling was found as a result of the observation was indicated by Symbol B.

The results are shown in Table 2.

TABLE 2

| | Example 1 | Example 6 | Example 7 | Comparative Example 3 | Comparative Example 4 | Comparative Example 5 |
|---|---|---|---|---|---|---|
| Elastic modulus Ead1 of adhesive resin at 20° C. [GPa] | 0.40 | 0.65 | 1.24 | 1.81 | 0.61 | 0.11 |
| Elastic modulus Ead2 of adhesive resin at 60° C. [GPa] | 0.17 | 0.23 | 0.26 | 1.35 | 0.33 | 0.01 |
| Ead2/Ead1 | 0.43 | 0.35 | 0.21 | 0.75 | 0.54 | 0.09 |
| Peeling | A | A | A | B | B | B |

As shown in Table 2, in each of Examples 1, 6, and 7 in which the Ead2 and Ead1 of the adhesive resin satisfied the relationship represented by the formula (1), the result of the peeling evaluation was A. Meanwhile, in each of Comparative Examples 3 to 5 in which the Ead2 and Ead1 of the adhesive resin did not satisfy the relationship represented by the formula (1), the result of the peeling evaluation was B.

As described above, according to the present disclosure, the optical element, which can suppress a change in surface shape thereof while effectively suppressing peeling between optical components made of materials different from each other in a usage environment involving a temperature change, can be provided.

According to the present disclosure, the optical element, which can suppress a change in surface shape thereof while effectively suppressing peeling between optical components made of materials different from each other in a usage environment involving a temperature change, can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-050104, filed Mar. 25, 2022, which is hereby incorporated by reference herein in its entirety.

What is claimed is:

1. An optical element comprising:
a first lens;
a second lens;
an optical resin arranged between the first lens and the second lens; and
an adhesive resin,
wherein opposing surfaces of the first lens and the optical resin, and/or opposing surfaces of the optical resin and the second lens are joined to each other with the adhesive resin,
wherein the first lens is a convex lens and the second lens is a concave lens,
wherein when a thickness of a center of the optical resin is represented by t0, and a thickness of an outer edge of the optical resin is represented by t1, t0 is larger than t1,
wherein when an elastic modulus of the adhesive resin at 20° C. is represented by Ead1, and an elastic modulus of the adhesive resin at 60° C. is represented by Ead2, Ead1 and Ead2 satisfy a relationship represented by formula (1):

$$0.2 \le Ead2/Ead1 \le 0.5 \quad (1),$$

wherein the second lens has a step structure on an outer periphery thereof,
wherein when a maximum thickness of the second lens is represented by h0, and a thickness of the step structure is represented by h, h is smaller than h0, and
wherein t0 and h satisfy a relationship represented by formula (2)

$$2.5 \le h/t0 \le 8.5 \quad (2).$$

2. The optical element according to claim 1, wherein t0 and h satisfy a relationship represented by formula (3)

$$4.0 \le h/t0 \le 6.5 \quad (3).$$

3. The optical element according to claim 1, wherein h0 and h satisfy a relationship represented by formula (4)

$$0.28 \le h/h0 \le 0.61 \quad (4).$$

4. The optical element according to claim 1, wherein when a diameter of the second lens is represented by Φ, and a width of the step structure is represented by w, to Φ and w satisfy a relationship represented by formula (5)

$$(\Phi/2) \times 0.05 \le w \le (\Phi/2) \times 0.3 \quad (5).$$

5. The optical element according to claim 4, wherein Φ is from 30 mm to 50 mm.

6. The optical element according to claim 1, wherein t0 is from 0.5 mm to 1.5 mm.

7. The optical element according to claim 1, wherein the first lens and the second lens each include glass.

8. An optical apparatus comprising:
a housing; and
an optical system arranged in the housing, the optical system having at least one lens,
wherein the at least one lens comprises an optical element, the optical element comprising:
a first lens;
a second lens;
an optical resin arranged between the first lens and the second lens; and
an adhesive resin,
wherein opposing surfaces of the first lens and the optical resin, and/or opposing surfaces of the optical resin and the second lens are joined to each other with the adhesive resin,
wherein the first lens is a convex lens and the second lens is a concave lens,
wherein when a thickness of a center of the optical resin is represented by t0, and a thickness of an outer edge of the optical resin is represented by t1, t0 is larger than t1,
wherein when an elastic modulus of the adhesive resin at 20° C. is represented by Ead1, and an elastic modulus of the adhesive resin at 60° C. is represented by Ead2, Ead1 and Ead2 satisfy a relationship represented by formula (1):

$$0.2 \leq Ead2/Ead1 \leq 0.5 \tag{1},$$

wherein the second lens has a step structure on an outer periphery thereof,
wherein when a maximum thickness of the second lens is represented by h0, and a thickness of the step structure is represented by h, h is smaller than h0, and
wherein t0 and h satisfy a relationship represented by formula (2)

$$2.5 \leq h/t0 \leq 8.5 \tag{2}.$$

9. An image pickup apparatus comprising:
a housing;
an optical system arranged in the housing, the optical system having at least one lens; and
an image pickup element configured to receive light that has passed through the optical system,
wherein the at least one lens comprises an optical element, the optical element comprising:
a first lens;
a second lens;
an optical resin arranged between the first lens and the second lens; and
an adhesive resin,
wherein opposing surfaces of the first lens and the optical resin, and/or opposing surfaces of the optical resin and the second lens are joined to each other with the adhesive resin,
wherein the first lens is a convex lens and the second lens is a concave lens,
wherein when a thickness of a center of the optical resin is represented by t0, and a thickness of an outer edge of the optical resin is represented by t1, t0 is larger than t1,
wherein when an elastic modulus of the adhesive resin at 20° C. is represented by Ead1, and an elastic modulus of the adhesive resin at 60° C. is represented by Ead2, Ead1 and Ead2 satisfy a relationship represented by formula (1):

$$0.2 \leq Ead2/Ead1 \leq 0.5 \tag{1},$$

wherein the second lens has a step structure on an outer periphery thereof,
wherein when a maximum thickness of the second lens is represented by h0, and a thickness of the step structure is represented by h, h is smaller than h0, and
wherein t0 and h satisfy a relationship represented by formula (2)

$$2.5 \leq h/t0 \leq 8.5 \tag{2}.$$

10. The image pickup apparatus according to claim 9, wherein the image pickup apparatus is a camera.

* * * * *